(12) United States Patent
Uen et al.

(10) Patent No.: US 6,529,067 B2
(45) Date of Patent: Mar. 4, 2003

(54) POWER SAVING CIRCUIT FOR WIRELESS POINTER

(76) Inventors: Tzong Wei Uen, 6F, No. 16, Lane 609, Sec. 5, Chung Hsing Rd., San-Chung City, Taipei Hsien (TW); Shun Bin Lin, 6F, No. 16, Lane 609, Sec. 5, Chung Hsing Rd., San-Chung City, Taipei Hsien (TW)

(*) Notice: Subject to any disclaimer, the term of this patent is extended or adjusted under 35 U.S.C. 154(b) by 58 days.

(21) Appl. No.: 09/791,557

(22) Filed: Feb. 26, 2001

(65) Prior Publication Data

US 2002/0118060 A1 Aug. 29, 2002

(51) Int. Cl.$^7$ ............................................. H05B 41/32
(52) U.S. Cl. ...................................... 327/544; 327/530
(58) Field of Search ................................ 327/530, 543, 327/544, 546, 545; 315/241, 225

(56) References Cited

U.S. PATENT DOCUMENTS 4,479,076 A * 10/1984 Yamaoka et al. ............ 315/241

* cited by examiner

*Primary Examiner*—Dinh T. Le
(74) *Attorney, Agent, or Firm*—Bacon & Thomas

(57) ABSTRACT

A power saving device for a wireless pointer includes a first resistor, a second capacitor, a signal generation circuit, and a bias control circuit including an n-type channel MOSFET having a drain connected to the signal generation circuit at a second node for driving the signal generation circuit, a switch having one end connected to a gate of the n-type channel MOSFET at a first node, a semiconductor means having an anode connected to the gate of the n-type channel MOSFET at the first node and a cathode connected to the positive terminal of the power source, and a first capacitor in series connection with the semiconductor means. When wireless pointer is inoperative, then the switch will open automatically to cause the leakage current of the reverse biased semiconductor means to charge the first capacitor. When the switch is closed, the first capacitor discharges completely so as to cut off the n-type channel MOSFET. The charging and discharging decrease the current consumption of the wireless pointer in standby to a minimum.

6 Claims, 3 Drawing Sheets

US 6,529,067 B2

1

POWER SAVING CIRCUIT FOR WIRELESS POINTER

FIELD OF THE INVENTION

The present invention relates to power saving circuits and more particularly to an improved circuit for further saving power of a wireless pointer in a standby state.

BACKGROUND OF THE INVENTION

Recently, electrical devices having a power saving feature are very attractive to consumers. Typically, such devices are automatically changed to a power saving mode when inoperative for a predetermined period of time. A conventional design for effecting the power saving feature is shown in FIG. 1. A relay or metal oxide semiconductor field effect transistor (MOSFET) 12 is enabled to cut off power 11 under the control of control 14 when a main electrical element 13 is inoperative for a predetermined period of time. When an activation signal is detected by control 14, the relay or MOSFET 12 is again enabled to connect power 11 to the main electrical element 13. In brief, the on/off of the main electrical element 13 is controlled by the control 14. However, power is continuously consumed in the control 14 irrespective of the on or off state of the main electrical element 13. Further, the design of the circuitry is complex. Furthermore, the on/off of the main electrical element 13 is not normal when the operating voltage is low. Thus improvements are needed.

SUMMARY OF THE INVENTION

It is an object of the present invention to provide a power saving device mounted in a wireless pointer powered by a source. The power saving device comprises a bias control circuit, a first resistor, a first capacitor, a second capacitor, and a signal generation circuit comprising an NPN transistor, a third capacitor, an inductor, a second resistor, a third resistor, a fourth capacitor and a fifth capacitor. The collector of the NPN transistor is connected to the positive terminal of the source through the third capacitor, while the emitter is connected to one end of the second resistor. The other end of the second resistor is connected to ground. The bias control circuit comprises a switch, a semiconductor means, the first capacitor, and an n-type channel MOSFET. One end of switch is connected to the gate of the n-type channel MOSFET at a first node, while the other end is connected to ground. A cathode of the semiconductor means is connected to the positive terminal of the source, while the anode is in series connection with the first capacitor at first node. The first capacitor is parallel connected to the switch between the first node and ground. The drain of the n-type channel MOSFET is connected to the base of the NPN transistor of the signal generation circuit. One end of the first resistor is connected to the positive terminal of the source, while the other end is in series connection with the second capacitor at a second node. The other end of the second capacitor is connected to ground. When the wireless pointer is inoperative for a predetermined period of time, the switch is automatically opened to cause the leakage current of the reverse biased semiconductor means to charge the first capacitor. Also, once the switch is operable, it closes to cause the first capacitor to discharge completely so as to cut off the n-type channel MOSFET. The charging and discharging decrease the current consumption of the wireless pointer during standby to a minimum.

The above and other objects, features and advantages of the present invention will become apparent from the following detailed description taken with the accompanying drawings.

2

DETAILED DESCRIPTION OF THE PREFERRED EMBODIMENTS

Figure 1:
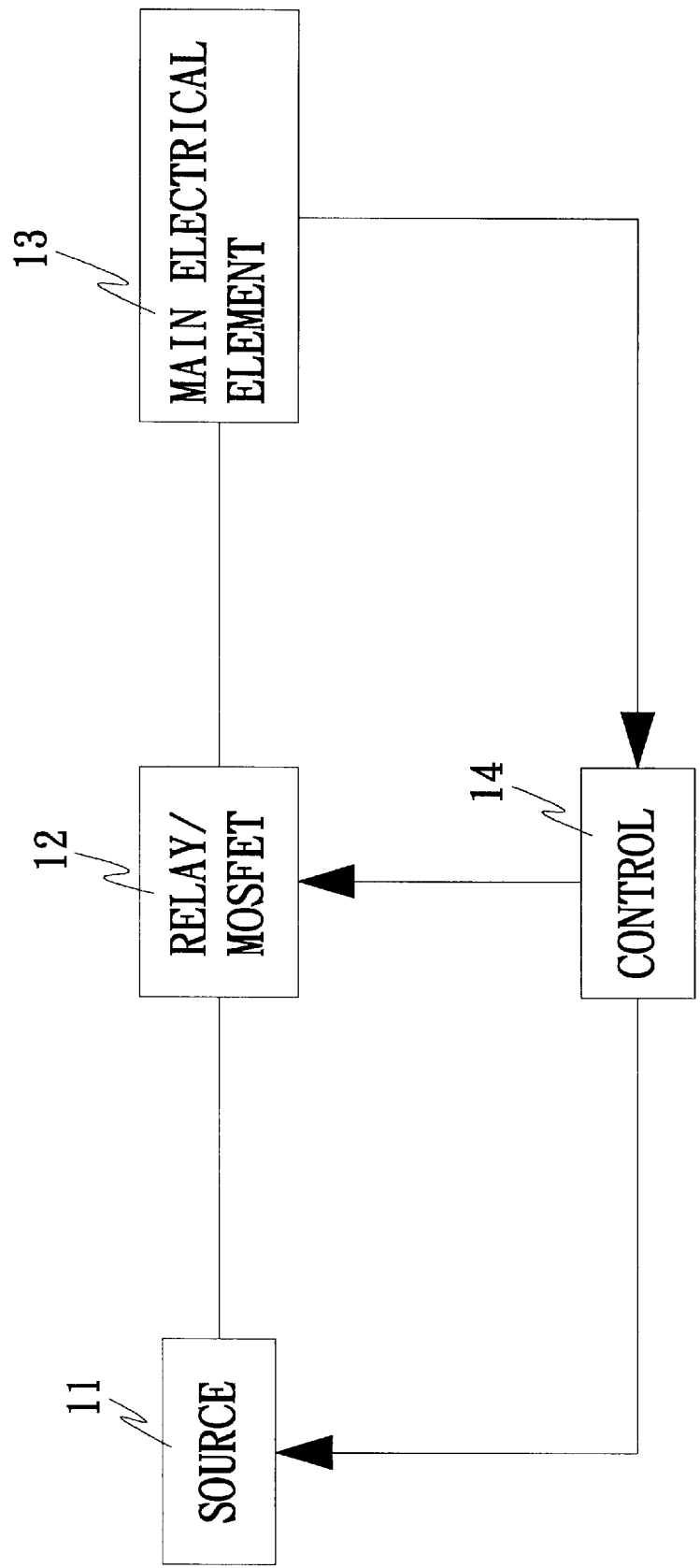
FIG. 1 is a block diagram of a conventional power saving circuit.
Figure 2:
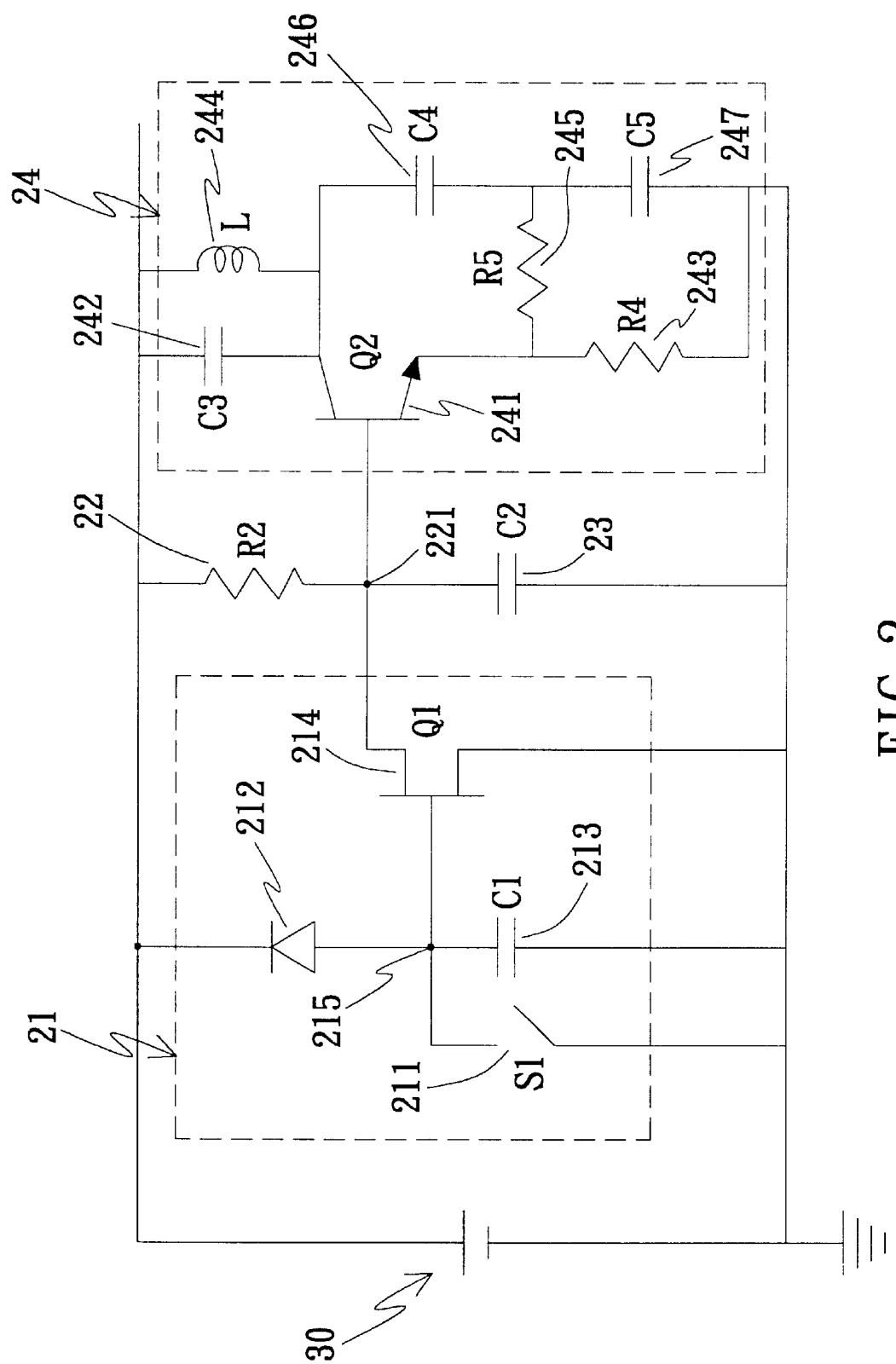
FIG. 2 is a circuit diagram of a power saving circuit according to the invention.

Referring to FIG. 2, there is shown a power saving circuit of the invention incorporated in a wireless pointer (not shown). The power saving circuit is powered by a source 30 and comprises a bias control circuit 21, a first resistor (R2) 22, a second capacitor (C2) 23, and a signal generation circuit 24. Each of the above constituent components will now be described.

Bias control circuit 21 comprises a switch (S1) 211, a semiconductor device 212, a first capacitor (C1) 213, and an n-type channel MOSFET (Q1) 214. Semiconductor device 212 is implemented as a PN diode (as shown), a resistor, or any other high impedance low current device (e.g., constant current source or high leakage capacitor). One end of switch (S1) 211 is connected to gate of MOSFET (Q1) 214 at a first node 215, while the other end is connected to the negative terminal of source 30 (i.e., ground). The cathode of semiconductor device 212 is connected to the positive terminal of source 30, while the anode is in series connection with first capacitor 213 at first node 215. First capacitor (C1) 213 is parallel connected to switch (S1) 211 between first node 215 and ground. In the embodiment, semiconductor device 212 is reverse biased. The drain of n-type channel MOSFET (Q1) 214 is connected to the base of NPN transistor (Q2) 241 of signal generation circuit 24. One end of first resistor 22 is connected to the positive terminal of source 30, while the other end is in series connection with second capacitor 23 at second node 221. The other end of second capacitor 23 is connected to the negative terminal of source 30 (i.e., ground).

The signal generation circuit 24 comprises an NPN transistor 241, a third capacitor (C3) 242, an inductor (L) 244, a second resistor (R4) 243, a third resistor (R5) 245, a fourth capacitor (C4) 246, and a fifth capacitor (C5) 247. The collector of NPN transistor 241 is connected to the positive terminal of source 30 through third capacitor (C3) 242, while the emitter is connected to one end of second resistor 243. The other end of second resistor 243 is connected to the negative terminal of source 30 (i.e., ground).

Figure 3:
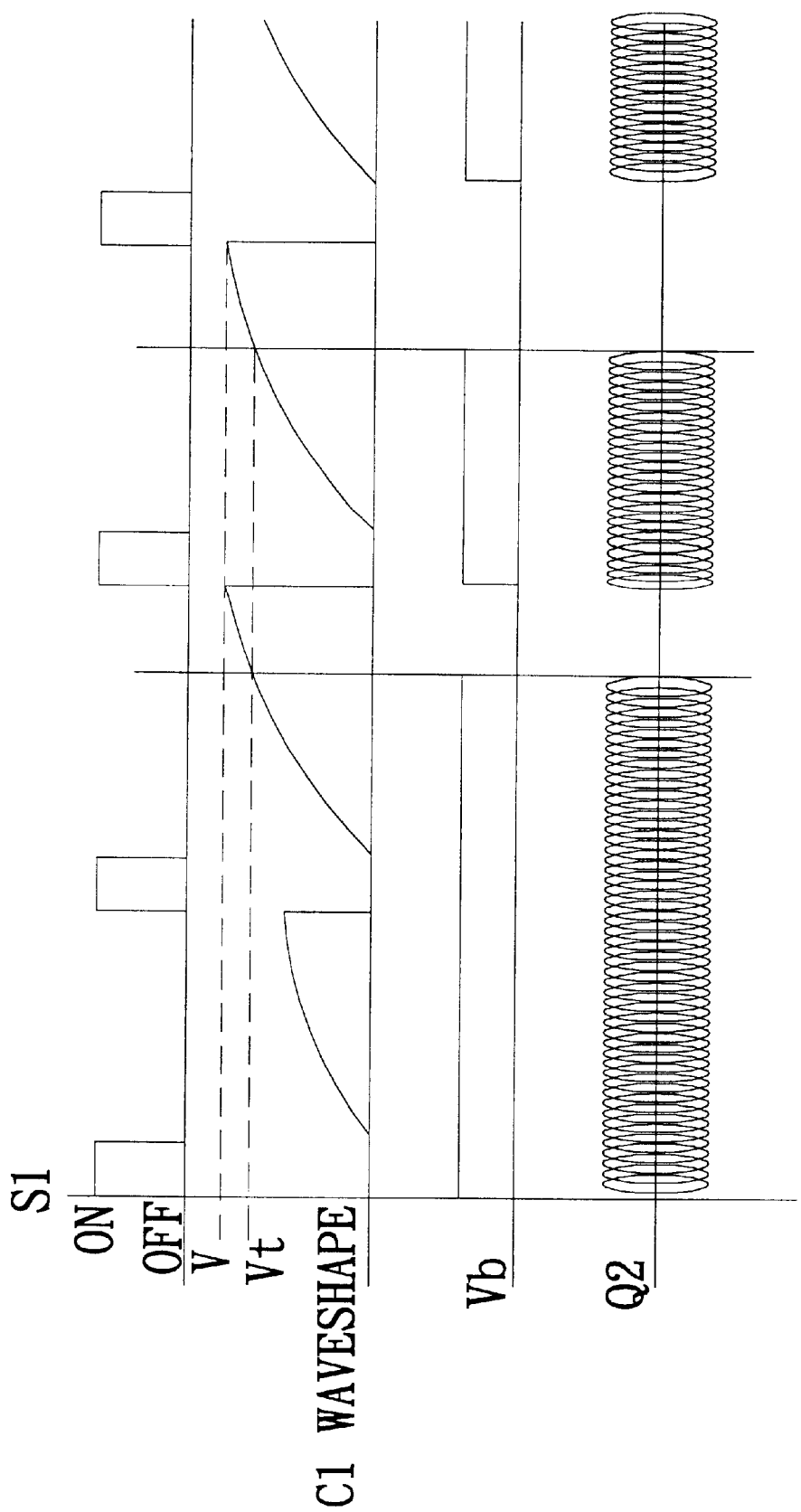
FIG. 3 shows waveshapes of various points in the FIG. 2 circuit.

Referring to FIG. 3 in conjunction with FIG. 2, the operation of the power saving circuit of the invention is detailed below. For the activation of the wireless pointer, user may close (i.e., enable) switch 211 to cause first capacitor 213 to discharge completely. Thus, the gate of n-type channel MOSFET (Q1) 214 is low, resulting in a cut-off of n-type channel MOSFET (Q1) 214. A normal bias is supplied from the positive terminal of source 30 through first resistor 22 to NPN transistor 241 of signal generation circuit 24 for enabling a normal operation therefor. The normally operated NPN transistor 241 of signal generation circuit 24 may transmit pointer signals so that a coordinate input device (not shown) may determine the coordinate location based on the pointer signals. Thus, the PN junction between base and collector of NPN transistor 241 is reverse biased, while the PN junction between base and emitter thereof is forward biased. When wireless pointer is inoperative then the switch 211 will open (i.e., be disabled) automatically. Immediately the leakage current of the reverse biased semiconductor device 212 will charge first capacitor 213. When the voltage built up in first capacitor 213 has reached the gate conduction voltage ($V_t$) of n-type channel MOSFET (Q1) 214, the operating bias $V_B$ of NPN transistor 241 of signal generation circuit 24 will become lower than the normal operating bias, thus cutting off the NPN transistor 241. Accordingly, the PN junction between base and collector of NPN transistor 241 is no longer reverse biased, while the PN junction between base and emitter thereof is no longer forward biased either. As a result, the wireless pointer stops transmitting pointer signals. In this case, the operating bias $V_B$ of NPN transistor 241 of signal generation circuit 24 may be defined as:

$$V_B=(Q1 \text{ conduction resistor } (R_{DS})/(Q1 \text{ conduction resistor } (R_{DS})+R2))\times V$$

Where Q1 conduction resistor $R_{DS}$ is near 0, thus $V_B$ is near 0. As an end, Q2 is cut off.

When the wireless pointer stops transmitting pointer signals, the current I consumed in the power saving circuit is about equal to V/R2. Since R2 may be selected to be very large, I is relatively small. Hence, the purpose of power saving is achieved. The time t measured from the stop of wireless pointer to the cut-off of Q2 may be defined as:

$$t=-R_1C_1 ln(1-Vt/V)$$

Where $R_1$, is a reverse resistor or any other high impedance low current element such as semiconductor device 212. In the case that semiconductor device 212 is a constant current source, t is equal to $C_1Vt/I$, where I is the current of the constant current source.

While the invention has been described by means of specific embodiments, numerous modifications and variations could be made thereto by those skilled in the art without departing from the scope and spirit of the invention set forth in the claims.

What is claimed is:

1. A power saving device mounted in a wireless pointer that includes a pointer signal generation circuit powered by a power source, said power saving device comprising:

a first capacitor and semiconductor means for supplying a leakage current to charge said capacitor, said first capacitor and said semiconductor means being connected in series with said power source;

a switch connected between ground and a first node between said first capacitor and said semiconductor means such that said capacitor discharges when said switch is closed;

an n-type channel MOSFET having a gate connected to said first node; and a first resistor and second capacitor connected in series with said power source, wherein a drain of said MOSFET is connected to a second node between said first resistor and said second capacitor, said second node being connected to said pointer signal generation circuit, wherein a gate conduction voltage of said MOSFET is less than a voltage at said first node when said capacitor is fully charged by said leakage current such that when said switch is open and said capacitor is fully charged, said MOSFET conducts to place said pointer signal generation circuit in a stand-by state in which current is drawn through said first resistor, and such that when said switch is closed and said first capacitor discharges through said switch, said MOSFET is rendered non-conductive to enable driving of said pointer signal generation circuit.

2. The power saving device of claim 1, wherein said semiconductor means has a high impedance.

3. The power saving device of claim 1, wherein said semiconductor means is a PN diode.

4. The power saving device of claim 1, wherein said semiconductor means has a constant current characteristic.

5. The power saving device of claim 1, wherein said semiconductor means is a capacitor.

6. The power saving device of claim 1, wherein said pointer signal driving circuit includes an NPN transistor having a base connected to said second node, whereby when a junction between the base and emitter of said transistor is reverse biased upon closure of said switch, discharge of said first capacitor, and conductivity of said MOSFET, said transistor drives said pointer signal generation device.

\* \* \* \* \*